(12) United States Patent
Adkisson et al.

(10) Patent No.: US 7,480,357 B2
(45) Date of Patent: Jan. 20, 2009

(54) SYSTEM AND METHOD FOR EFFECTUATING THE TRANSFER OF DATA BLOCKS ACROSS A CLOCK BOUNDARY

(75) Inventors: Richard W. Adkisson, Dallas, TX (US); Huai-Ter Victor Chong, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1196 days.

(21) Appl. No.: 10/625,365

(22) Filed: Jul. 23, 2003

(65) Prior Publication Data

US 2004/0223516 A1 Nov. 11, 2004

Related U.S. Application Data

(60) Provisional application No. 60/469,503, filed on May 10, 2003.

(51) Int. Cl.
*H04L 7/00* (2006.01)
(52) U.S. Cl. .................... 375/354; 370/324; 713/324; 714/731
(58) Field of Classification Search ............... 370/466; 375/354, 370; 710/240; 711/401; 713/322, 713/400
See application file for complete search history.

(56) References Cited

U.S. PATENT DOCUMENTS

| | | | |
|---|---|---|---|
| 5,347,559 A | | 9/1994 | Hawkins et al. |
| 6,084,934 A | * | 7/2000 | Garcia et al. .................. 375/370 |
| 6,115,823 A | * | 9/2000 | Velasco et al. ............... 713/322 |
| 6,134,155 A | | 10/2000 | Wen |
| 6,249,875 B1 | * | 6/2001 | Warren ......................... 713/400 |
| 6,317,806 B1 | * | 11/2001 | Audityan et al. ............. 711/101 |
| 2002/0144039 A1 | * | 10/2002 | Lackey et al. ................ 710/240 |
| 2002/0199124 A1 | | 12/2002 | Adkisson |
| 2003/0016697 A1 | * | 1/2003 | Jordan ......................... 370/466 |

OTHER PUBLICATIONS

Affidavit of Richard W. Adkisson, Feb. 17, 2005, 4 pages.

* cited by examiner

*Primary Examiner*—Kevin M Burd
*Assistant Examiner*—Adolf Dsouza

(57) ABSTRACT

A system and method for effectuating the transfer of data blocks having intervals across a clock boundary between a first clock domain and a second clock domain. A first circuit portion provides the data blocks to a second circuit portion. A synchronizer controller disposed between the first and second clock domains provides at least one dead cycle control signal to the second circuit portion, which is indicative of the location of at least one dead cycle between the first and second clock signals. Control logic associated with the second circuit portion generates data transfer control signals responsive to the at least one dead cycle control signal in order to control the second circuit portion so that the data blocks may be transmitted as contiguous data blocks relative to the at least one dead cycle.

10 Claims, 7 Drawing Sheets

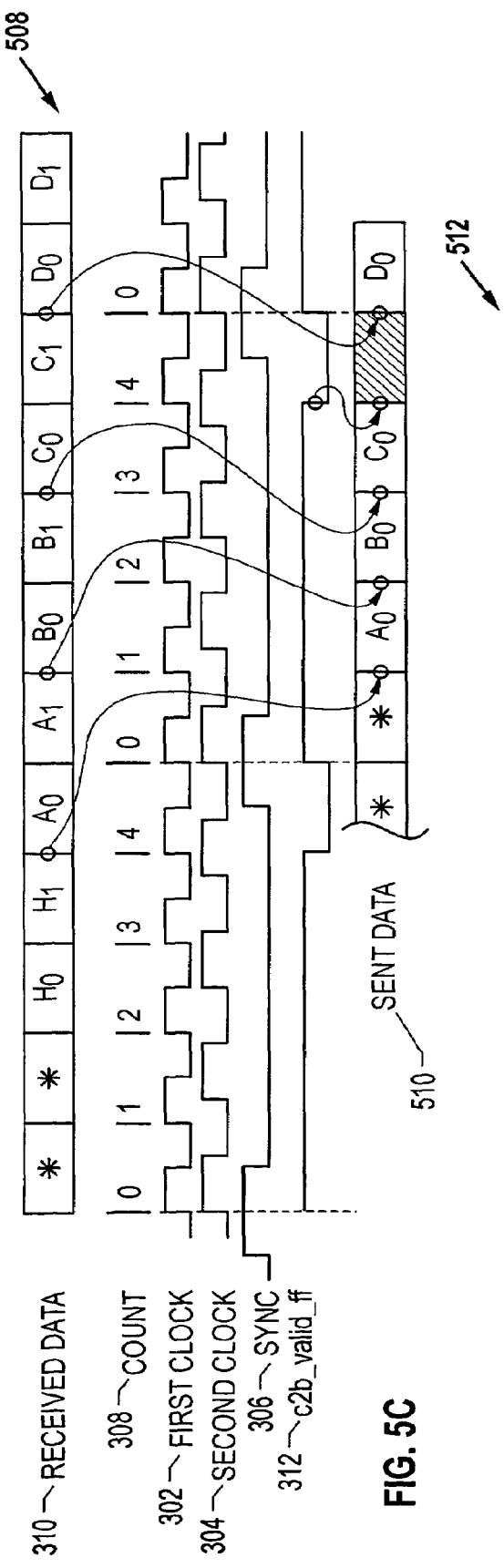

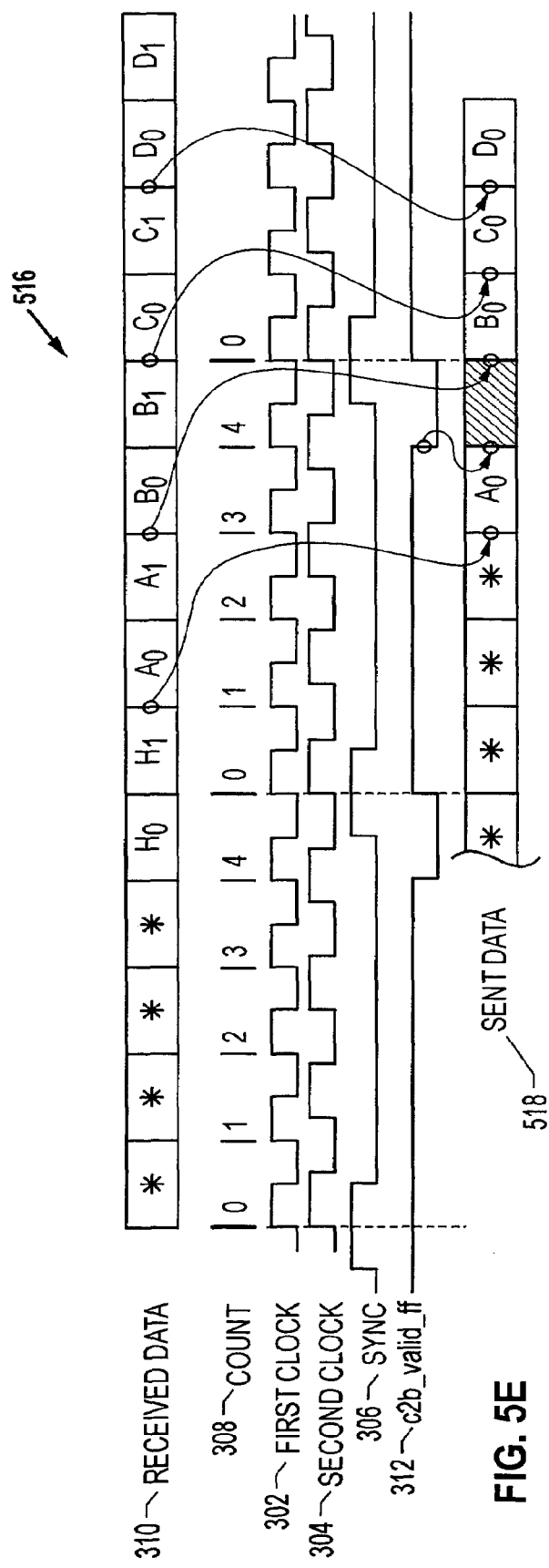

SYSTEM AND METHOD FOR EFFECTUATING THE TRANSFER OF DATA BLOCKS ACROSS A CLOCK BOUNDARY

PRIORITY UNDER 35 U.S.C. §119(e) & 37 C.F.R. §1.78

This nonprovisional application claims priority based upon the following prior United States provisional patent application entitled: "System And Method For Effectuating The Transfer Of Data Blocks Across A Clock Boundary," Ser. No.: 60/469,503, filed May 10, 2003, in the names of Richard W. Adkisson and Huai-Ter Victor Chong, which is hereby incorporated by reference.

CROSS-REFERENCE TO RELATED APPLICATION(S)

This application discloses subject matter related to the subject matter disclosed in the following commonly owned co-pending patent applications: "System and Method for Effectuating the Transfer of Data Blocks Including a Header Block Across a Clock Boundary," application Ser. No. 10/625,291, filed Jul. 23, 2003, in the name(s) of: Richard W. Adkisson and Huai-Ter Victor Chong, which is hereby incorporated by reference.

BACKGROUND

By way of example, FIG. 1 depicts a timing sequence 100 of two clock domains having an N:(N−1) frequency ratio wherein data transfer across the clock boundary between the domains results in an extra data cycle or "dead cycle" in which data cannot be transferred. As is well known, data transfer operations between circuitry of a first clock domain and circuitry of a second clock domain are effectuated by synchronizer circuitry disposed therebetween. Further, the first and second clock domains are operable with clock signals that have a particular cycle ratio. For instance, the circuitry of the first clock domain ("fast clock domain") may be clocked with a first clock signal (CLK1) that is faster than a second clock signal (CLK2) used for clocking the circuitry of the second clock domain ("slow clock domain") such that there are N first clock cycles to (N−1) second clock cycles. In one application, core clock circuitry and bus clock circuitry of a computer system may represent the first and second clock domains, respectively, wherein CLK1 and CLK2 signals correspond to the core clock (CC) and bus clock (BC) signals.

A synchronizer controller circuit (not shown in FIG. 1) is usually provided for controlling the operation of synchronizer circuitry disposed between the two clock domains. Additionally, a control signal such as a SYNC pulse may be generated based on a predetermined temporal relationship between CLK1 and CLK2 for synchronizing the data transfer operations. For example, the SYNC pulse may be generated when a rising edge of the CLK1 signal coincides with a rising edge of the CLK2 signal, which commences a data transmit window for the transfer of data blocks, which may include one or more data bits, from one clock domain to the other clock domain.

The timing sequence 100 of FIG. 1 illustrates an embodiment of CLK1 104, CLK2 106 and SYNC pulse signal 108, wherein for every five ticks of CLK1 there are four ticks of the slow clock (i.e., CLK2). A cycle count 102 refers to the numbering of CLK1 cycles in a particular data transmit window of the timing sequence 100. Data to be transferred from the fast clock domain is clocked at CLK1, that is, 5 data block pulses per window are available.

As alluded to before, the SYNC pulse 108 is high on coincident rising edges of CLK1 and CLK2 and the data transfer operations across the clock boundary between the two clock domains are timed with reference to the SYNC pulse. In a normal condition where there is no skew (or, jitter, as it is sometimes referred to) between CLK1 and CLK2, the coincident edges occur on the rising edges of the first cycle (cycle 0) as shown in FIG. 1. Since there are five CLK1 cycles and only four CLK2 cycles, CLK1 domain circuit portion cannot transmit data during one cycle resulting in what is known as a "dead tick," as CLK2 domain circuit portion does not have a corresponding time slot for receiving it. Typically, the cycle that is least skew tolerant is the one where data is not transmitted and, in the exemplary timing sequence shown in FIG. 1, it is the fourth cycle (i.e., cycle 3).

Skew between CLK1 and CLK2 signals can cause, for example, a variance in the positioning of the SYNC pulse which affects the data transfer operations between CLK1 and CLK2 domains. In the exemplary 5:4 frequency ratio scenario set forth above, if CLK2 leads CLK1 by a quarter cycle for instance, then instead of the edges being coincident at the start of cycle 0, they will be coincident at the start of cycle 1 and the dead tick's location may accordingly vary. In similar fashion, if CLK2 lags CLK1 by a quarter cycle, the edges will be coincident at the start of the last cycle (i.e., cycle 4). Regardless of the skew between the clock cycles, however, there will be a cycle where a data block cannot be sent, resulting in data transfer at less than full bandwidth. Furthermore, in channelized data transmission scenarios, where multiplexed data blocks are transmitted from a fast clock domain to a slow clock domain sequentially as contiguous data blocks, the latency introduced by dead cycles presents problems.

SUMMARY

A system and method are disclosed for effectuating the transfer of data blocks having intervals across a clock boundary between a first clock domain and a second clock domain. A first circuit portion provides the data blocks to a second circuit portion. A synchronizer controller disposed between the first and second clock domains provides at least one dead cycle control signal to the second circuit portion, which is indicative of the location of at least one dead cycle between the first and second clock signal. Control logic associated with the second circuit portion generates data transfer control signals responsive to the at least one dead cycle control signal in order to control the second circuit portion so that the data blocks may be transmitted as contiguous data blocks relative to the at least one dead cycle.

BRIEF DESCRIPTION OF THE DRAWINGS

FIG. 5C depicts a timing drawing of data received at a third time and sent data associated with the control signal of the system illustrated in FIG. 3;

FIG. 5D depicts a timing drawing of data received at a fourth time and sent data associated with the control signal of the system illustrated in FIG. 3; and FIG. 5E depicts a timing drawing of data received at a fifth time and sent data associated with the control signal of the system illustrated in FIG. 3.

DETAILED DESCRIPTION OF THE DRAWINGS

Figure 1:
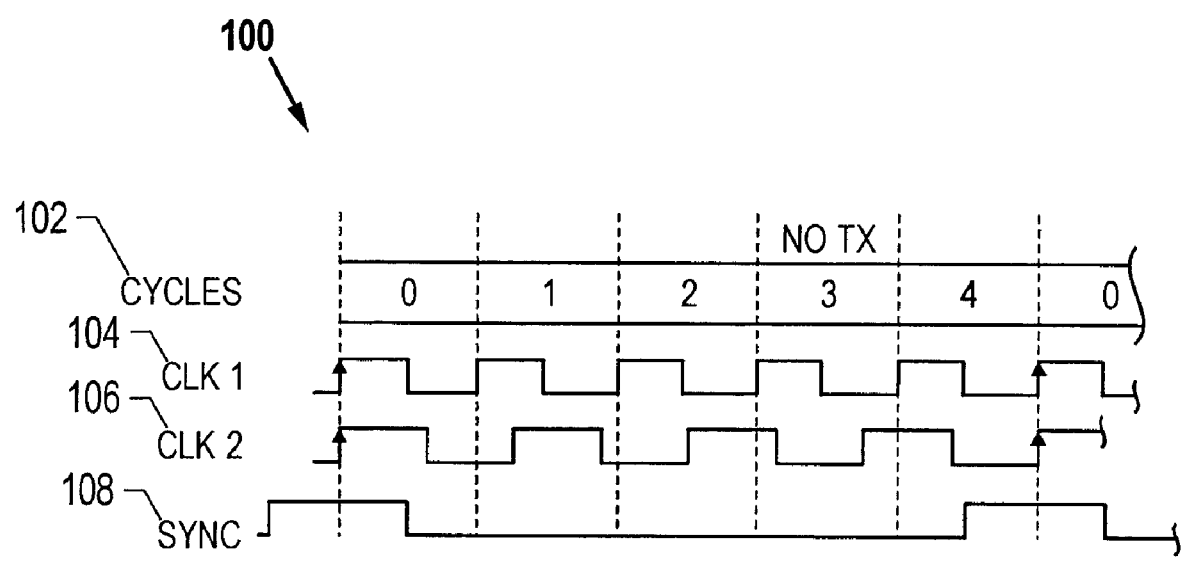
FIG. 1 (Prior Art) depicts a timing sequence of two clock domains having a known frequency ratio wherein data transfers across the clock boundary using a conventional synchronizer results in an extra data cycle in which data cannot be transferred.
Figure 2:
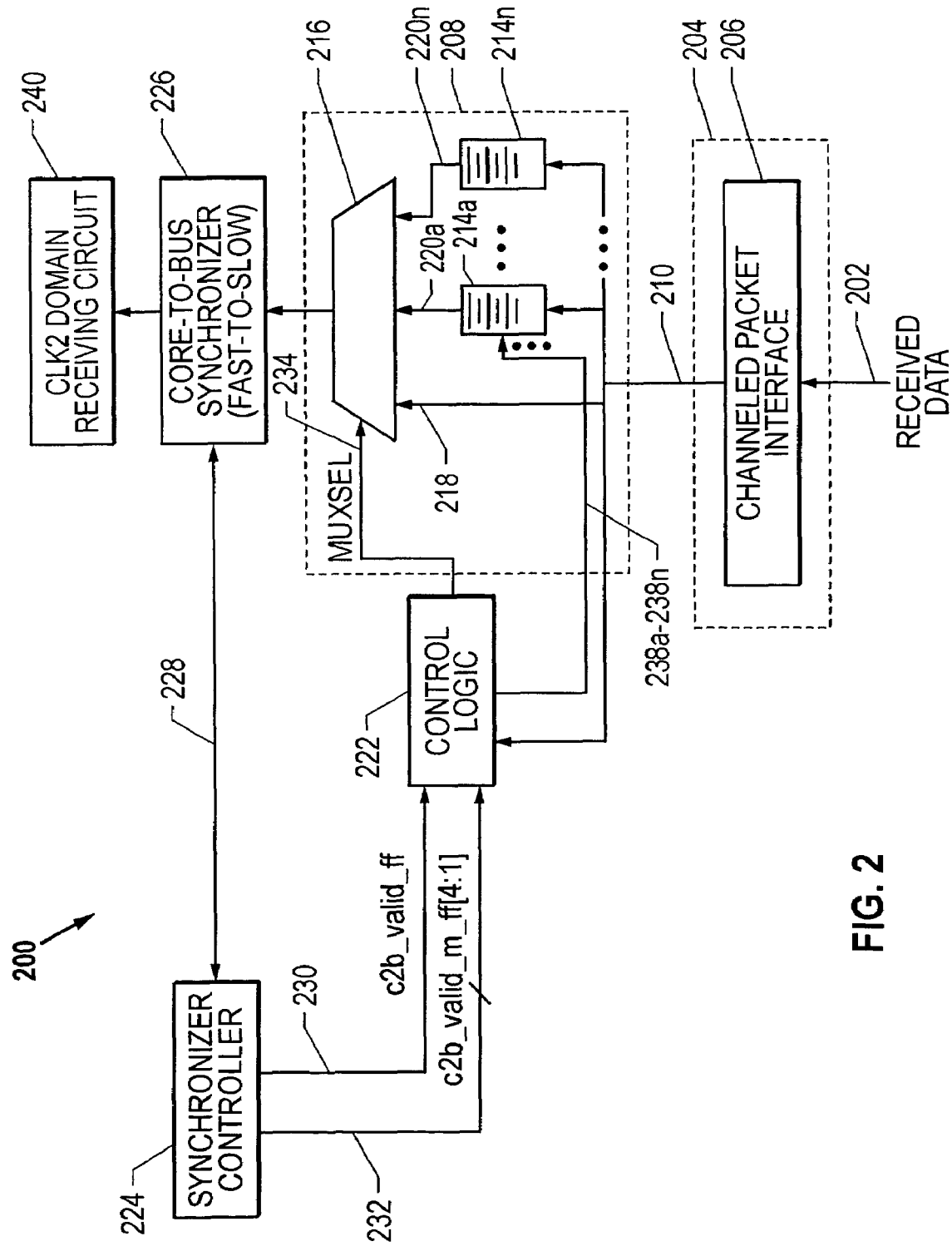
FIG. 2 depicts block diagram of a system for effectuating the transfer of data blocks having intervals across a clock boundary between a first clock domain and a second clock domain.

In the drawings, like or similar elements are designated with identical reference numerals throughout the several views thereof, and the various elements depicted are not necessarily drawn to scale. Referring now to FIG. 2, therein is depicted a system 200 for effectuating the transfer of data blocks having intervals across a clock boundary between a first clock domain (e.g., a core clock domain) having N fast clock cycles and a second clock domain (e.g., a bus clock domain) having M slow clock cycles such that N/M>1. Received data, e.g., core data generated by circuitry in the first clock domain, is provided on an incoming data path 202 at full bandwidth for transport to a first circuit portion 204 that includes a channeled packet interface 206. The received data may include a data packet comprising N intervaled data pulses or blocks in a timing cycle window. Each intervaled data block may include one or more bits that are spaced apart by an interval element which may include empty cycles. For example, the data may take the form $A_0\_B_0\_C_0\_D_0$ wherein each "_" represents an empty cycle. In one embodiment, the received data may be multiplexed data that includes at least two sets of interleaved data blocks. In this embodiment, the data blocks are positioned in a spaced arrangement. For example, the data may take the form $A_0A_1B_0B_1C_0C_1D_0D_1$ if two packets of interleaved data blocks, i.e., data blocks $A_0B_0C_0D_0$ and data blocks $A_1B_1C_1D_1$, are present, or $A_0A_1A_2B_0B_1B_2C_0C_1C_2D_0D_1D_2$ if three packets of interleaved data blocks, i.e., $A_0B_0C_0D_0$, $A_1B_1C_1D_1$ and $A_2B_2C_2D_2$, are present. Additionally, each data packet may include a header that provides protocol control information about the data packet. For example, a header $H_0$ may be positioned at the beginning of a data packet, e.g., $H_0A_0B_0C_0D_0$.

The first circuit portion 204 provides the data blocks to a second circuit portion 208 via data path 210. Second circuit portion 208 includes at least one queue, for example, queues 214a through 214n, for transmitting data blocks to a multiplexer (MUX) block 216 via data paths 220a through 220n. In one embodiment, the queues are first-in-first-out (FIFO) queues. In order to transmit the incoming intervaled data received via data path 210 as contiguous data, portions of the intervaled data are temporarily stored. The series of queues 214a through 214n provide temporary storage for the incoming data blocks received from the data path 210. The duration of the temporary storage, if required for a particular data block, depends on the total number of data blocks in the received data and the number of dead cycles. Data path 218 provides data blocks to the MUX block 216 without queuing. In one embodiment, the number of dead cycles equals N–M. It should be appreciated that a portion of a data packet, such as the header, may be stripped from the incoming data packet and forwarded to a control logic block 222 associated with the second circuit portion 208. Based on the information stored in the header and the number of dead cycles, the control logic block 222, which may take the form of a state machine, calculates the number of data blocks in the intervaled data and, accordingly, the length of time to store each data block. As will be explained in more detail hereinbelow, for example, if two multiplexed packets each having four data blocks with headers were received and only one dead cycle is present, the control logic 202 temporarily stores the first data block of the first packet for a number of cycles depending on the location of the dead cycle.

A synchronizer controller 224 is in communication with a core-to-bus synchronizer 226 as illustrated by a data flow line 228. The synchronizer controller 224 provides a series of dead cycle control signals, c2b_valid_ff 230 and c2b_valid_m_ff[4:1] 232, which provide advance notice of the locations of the dead cycles between the first and second clock signals. The synchronizer controller 224 provides its advance knowledge of the position of the dead cycles to the control logic block 222 so that the second circuit portion 208 may be controlled to send data to the synchronizer 226 whereby the data is optimally positioned about one or more dead cycles, which dead cycles are to removed by the synchronizer 226 in operation, resulting in an ordered and contiguous data output to the second clock domain. The control logic 222 associated with the second circuit portion provides a MUX selection control signal 234 to the MUX block 216 and a series of control signals 238a-238n for clocking out data blocks stored in the queues 214a-214n) so that appropriate data blocks can be selected as MUX output.

Accordingly, the data blocks received from the channeled packet interface 206 are transmitted as contiguous data output about the one or more dead cycles from the MUX block 216 to the synchronizer 226, i.e., a fast-to-slow synchronizer such as a core-to-bus synchronizer, operating under the control of the synchronizer controller 224. For example, continuing with the example of receiving multiplexed data, e.g., $A_0A_1B_0B_1C_0C_1D_0D_1$, having two interleaved data packets, the data is transmitted sequentially and contiguously to a second clock domain circuit 240 as $A_0B_0C_0D_0A_1B_1C_1D_1$. By positioning the data about the dead cycles, based on the advance knowledge provided by the synchronizer controller, into the contiguous transmission to the core-to-bus synchronizer, an embodiment of the present invention minimizes latency and provides for the efficient transfer of data across clock boundaries.

Figure 3:
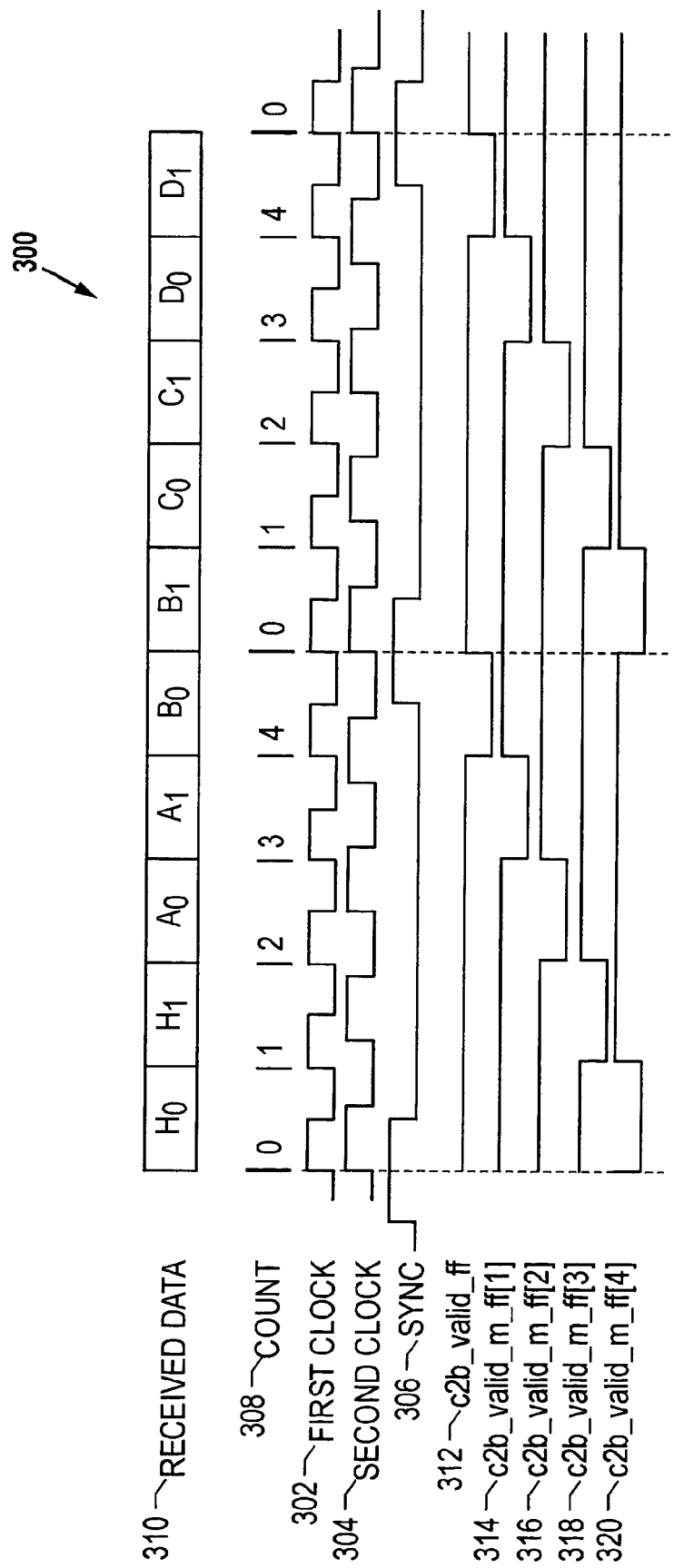
FIG. 3 depicts a timing drawing of the various signals associated with the system for effectuating the transfer of contiguous data blocks with at least one dead cycle interleaved therein.

FIG. 3 depicts a timing drawing of the various signals associated with the system 200 described hereinabove. As illustrated, the timing sequence 300 exemplifies an embodiment of a FIRST CLOCK signal 302, a SECOND CLOCK signal 304 and a SYNC pulse signal 306, wherein within each timing window, five FIRST CLOCK signals 302 are present for every four SECOND CLOCK signals 304. A cycle COUNT 308 refers to the numbering of FIRST CLOCK signals 302 in a particular data transmit window of the timing sequence 300. Received data 310, i.e., core data, includes two multiplexed data packets, packets 0 and 1 which are to be transferred from the fast clock domain as represented by the FIRST CLOCK signal 302 to the slow clock domain as represented by the SECOND CLOCK signal 304. The data blocks of each packet are designed by their respective subscripts 0 and 1. For example, packet 0 comprises data blocks $A_0, B_0, C_0,$ and $D_0$ (with a header $H_0$) that are interleaved with the data blocks of packet 1 which include data blocks $A_1, B_1, C_1,$ and $D_1$ (with a header $H_1$). The SYNC pulse signal 306 may be generated based on a predetermined temporal relationship between the FIRST CLOCK and the SECOND CLOCK. As illustrated, the SYNC pulse is high on the coincident rising edges of the FIRST CLOCK and the SECOND CLOCK and the data processing operations of the second circuit portion are timed with reference to the SYNC pulse. As alluded to in the Background, since the FIRST CLOCK has five cycles and the SECOND CLOCK has four cycles, the FIRST CLOCK domain circuit portion cannot transmit data during one cycle resulting in one dead cycle, as the SECOND CLOCK domain circuit portion does not have a corresponding time slot for receiving it. The dead cycle control signals, c2b_valid_ff 312, c2b_valid_m_ff[1] 314, c2b_valid_m_ff[2] 316, c2b_valid_m_ff[3] 318, and c2b_valid_m_ff[4] 320, asserted by the synchronizer controller provide advance notice of the location of the dead cycle between the FIRST CLOCK domain and the SECOND CLOCK domain. Specifically, the c2b_valid_ff control signal 312 indicates that the dead cycle is occurring at the 5th cycle, cycle 4, the c2b_valid_m_ff[1] control signal 314 provides one cycles advance notice that the dead cycle is at the 5th cycle, cycle 4, the c2b_valid_m_ff[2] control signal 316 provides two cycles advance notice that the dead cycle is at the 5th cycle, cycle 4, the c2b_valid_m_ff[3] control signal 318 provides three cycles advance notice that the dead cycle is at the 5th cycle, cycle 4, and the c2b_valid_m_ff[4] control signal 320 provides four cycles advance notice that the dead cycle is at the 5th cycle, cycle 4.

Figure 4:
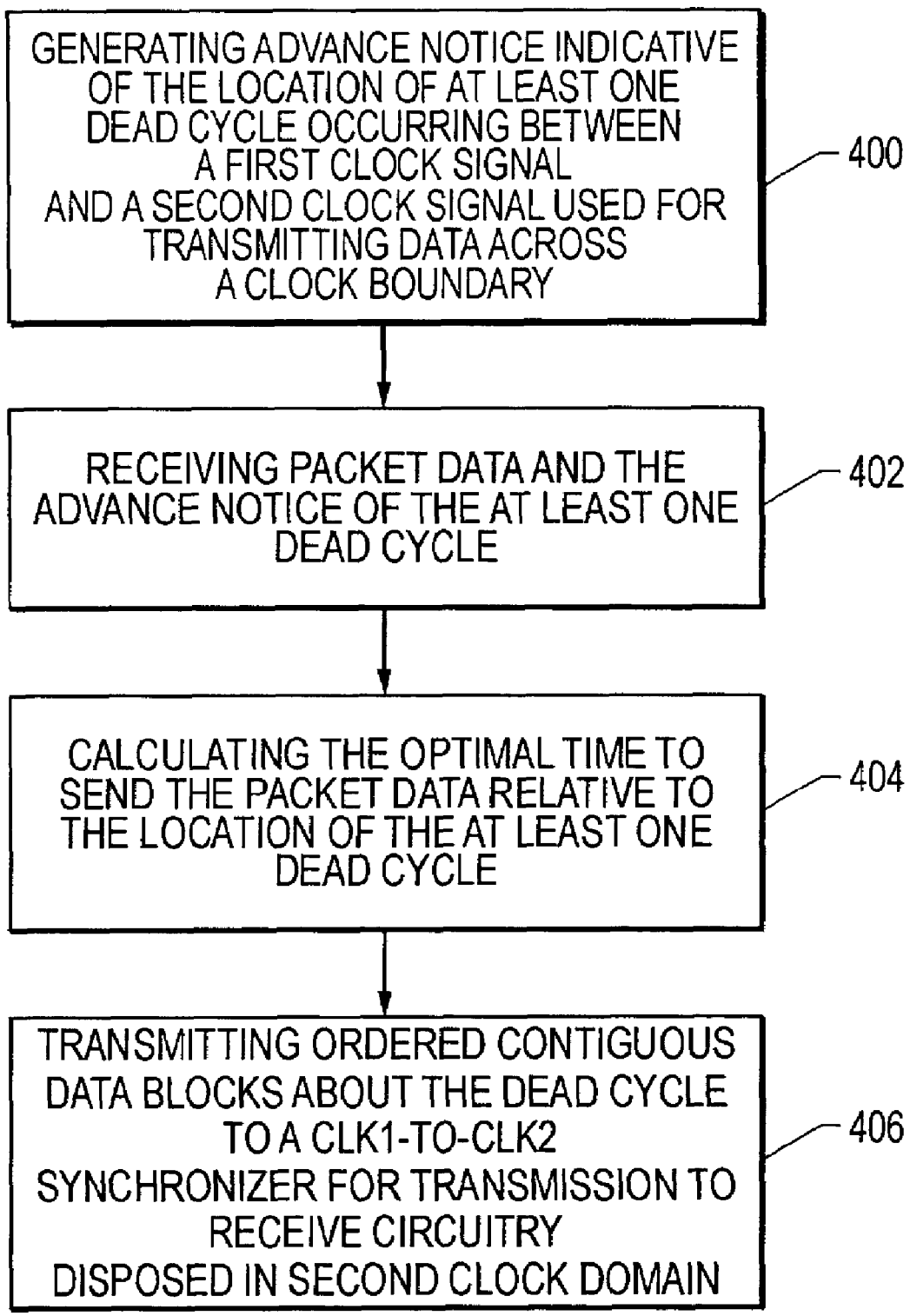
FIG. 4 depicts a flow chart illustrating an embodiment of a method for effectuating the transfer of data blocks having intervals across a clock boundary between a first clock domain and a second clock domain.

FIG. 4 depicts a flow chart of an embodiment of a method for effectuating the transfer of data blocks having intervals across a clock boundary between a first clock domain and a second clock domain. At block 400, the synchronizer controller generates advance notice that indicates the location of the at least one dead cycle occurring between a first clock signal and a second clock signal used for transmitting data across a clock boundary. At block 402, a circuit portion receives packet data from a channeled packet interface and the advance notice is received from the synchronizer controller. At block 404, the optimal time to send the packet data relative to the location of the at least one dead cycle is calculated. At block 406, ordered contiguous data blocks are transmitted about the dead cycle to a CLK1-TO-CLK2 synchronizer for transmission to receive circuitry disposed in the second clock domain.

FIG. 5A-5E depict a plurality of timing drawings of received data and sent data associated with a plurality of control signals described above. As illustrated in FIG. 3, with reference to the timing drawing 500 of FIG. 5A, five FIRST CLOCK signals 302 are present within each timing window for every four SECOND CLOCK signals 304. Also, a SYNC pulse 306 is present that effectuates the transfer operations between the FIRST CLOCK domain and the SECOND CLOCK domain. Since five FIRST CLOCK signals 302 are present for every four SECOND CLOCK signals 304, one dead cycle per transmission window is present. Multiplexed packets 0 and 1 provide interleaved data blocks, i.e., $H_0, H_1, A_0, A_1, B_0, B_1, C_0, C_1, D_0,$ and $D_1$, or channeled packet data. In the timing drawing 500 of FIG. 5A, the synchronizer controller indicates the location of the dead cycle by sending control signal c2b_valid_ff 312 to the control logic. Control signal c2b_valid_ff 312 indicates that the fifth cycle, cycle 4, of the timing window is a dead cycle for the transmission of data from the fast clock domain to the slow clock domain.

Alternatively, one of the other control signals, c2b_valid_m_ff[1], c2b_valid_m_ff[2], c2b_valid_m_ff[3], or c2b_valid_m_ff[4], may have been asserted. For example, if the c2b_valid_m_ff[1] signal had been asserted, the c2b_valid_m_ff[1] signal would have been low at the fourth cycle, cycle 3, to provide one cycles warning that the dead cycle is positioned at the fifth cycle, cycle 4. Similarly, if the c2b_valid_m_ff[4] signal had been asserted, the c2b_valid_m_ff[4] signal would have been low at the first cycle, cycle 0, to provide four cycles warning that the dead cycle is positioned at the fifth cycle, cycle 4.

Accordingly, the control logic and MUX of the present system transmit sent data 502 contiguously, i.e., $A_0B_0C_0D_0XA_1B_1C_1D_1X$, optimally positioning the data about the dead cycle (X) based upon the advance notice of the position of the dead cycle provided by the control signal c2b_valid_ff 312. It should be appreciated that although timing drawing 500 only depicts packet 0 being transmitted (sent data 502), packet 1, i.e., $A_1B_1C_1D_1$, is transmitted as well. In particular, the following table illustrates the operations of one embodiment of the second circuit portion operating under control signal c2b_valid_ff 312:

TABLE 1

Operation of Second Circuit Portion Under Control Signal c2b_valid_ff

| CYCLE | OPERATION(S) |
|---|---|
| 0 | Receive header block $H_0$ at control logic |
| 1 | Receive header block $H_1$ at control logic |
| 2 | Receive data block $A_0$ from channeled packet interface (CPI) |
|   | Temporarily store data block $A_0$ in a first queue |
| 3 | Receive data block $A_1$ from CPI |
|   | Temporarily store data block $A_1$ in second queue |
| 4 | Receive data block $B_0$ from CPI |
|   | Temporarily store data block $B_0$ in the first queue |
|   | Receive advance notice that the dead cycle is positioned in the fifth cycle, cycle 4 |
| 0 | Receive data block $B_1$ from CPI |
|   | Temporarily store data block $B_1$ in the second queue |
|   | Send data block $A_0$ |
| 1 | Receive data block $C_0$ from CPI |
|   | Temporarily store data block $C_0$ in the first queue |
|   | Send data block $B_0$ |
| 2 | Receive data block $C_1$ from CPI |
|   | Temporarily store data block $C_1$ in the second queue |
|   | Send data block $C_0$ |
| 3 | Data block $D_0$ passes through via a register without queuing |
| 4 | Receive data block $D_1$ from CPI |
|   | Temporarily store data block $D_1$ in the second queue |
|   | Receive advance notice that the dead cycle is positioned in the fifth cycle, cycle 4 |
|   | No Transmission - Dead Cycle |
| 0 | Send data block $A_1$ |
| 1 | Send data block $B_1$ |
| 2 | Send data block $C_1$ |
| 3 | Send data block $D_1$ |
| 4 | Receive advance notice that the dead cycle is positioned in the fifth cycle, cycle 4 |
|   | No Transmission - Dead Cycle |

Similarly, FIGS. 5B-5E depict various configurations of sent data having contiguous data blocks positioned relative to a dead cycle. In particular, the received data 310 may arrive at different cycles relative to the fixed location of the dead cycle. For example, with reference to FIG. 5A, the received data 310 arrives at the first cycle, cycle 0 and the dead cycle is at the fifth cycle, cycle 4. By way of another example, with reference to FIG. 5B, the received data 310 arrives at the second cycle, cycle 1 and the dead cycle is at the fifth cycle, cycle 4. The synchronizer controller 224 asserts one of the control signals 312-320 to provide from zero to N cycles advance notice to the control logic and associated circuit portions relative to the location of the dead cycle. It will be appreciated that the particular amount of advance notice required depends on several factors including the cycle at which the received data is received and the complexity of data within each data block. With the advance notice of the location of the dead cycle, the control logic and associated circuit portions may optimize the transmission of the received data about the dead cycle such that ordered and contiguous data is received in the second clock domain.

Figures 5A, 5B:
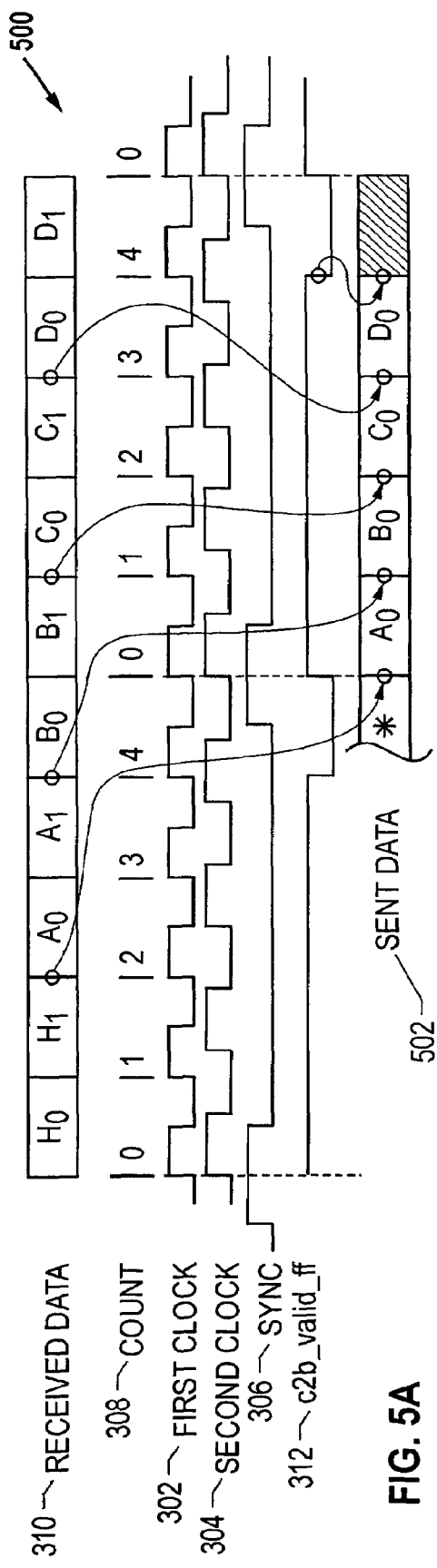
FIG. 5A depicts a timing drawing of data received at a first time and sent data associated with control signal of the system illustrated in FIG. 3.
FIG. 5B depicts a timing drawing of data received at a second time and sent data associated with the control signal of the system illustrated in FIG. 3.

For example, with reference to timing drawing 504 of FIG. 5B, the received data 310 arrives at the second cycle and the control signal c2b_valid_m_ff 312 indicates that the dead the cycle is positioned at the fifth cycle, cycle 4. Accordingly, sent data 506 is optimally transmitted as $A_0B_0C_0XD_0$. It should be appreciated that depending on the cycle at which the data is received, the data blocks may be positioned such that the dead cycle may appear interleaved between two data blocks or at the leading end, i.e., before $A_0$, or at the trailing end, i.e., after $D_0$, of a data packet. The following table illustrates the operations of one embodiment of the second circuit portion operating under control signal c2b_valid_ff[1] 314 during the first ten cycle counts:

TABLE 2

Operation of Second Circuit Portion Under Control Signal c2b_valid_ff when Data is Received at the Second Cycle

| CYCLE | OPERATION(S) |
|---|---|
| 0 | No Transmission - Data has not yet arrived |
| 1 | Receive header block $H_0$ at control logic |
| 2 | Receive header block $H_1$ at control logic |
| 3 | Receive data block $A_0$ from CPI |
|   | Temporarily store data block $A_0$ in a first queue |
| 4 | Receive data block $A_1$ from CPI |
|   | Temporarily store data block $A_1$ in second queue |
|   | Receive advance notice indicating that the dead cycle is at the fifth cycle, cycle 4 |
| 0 | Receive data block $B_0$ from CPI |
|   | Temporarily store data block $B_0$ in the first queue |
| 1 | Receive data block $B_1$ from CPI |
|   | Temporarily store data block $B_1$ in the second queue |
|   | Send data block $A_0$ |
| 2 | Receive data block $C_0$ from CPI |
|   | Temporarily store data block $C_0$ in the first queue |
|   | Send data block $B_0$ |
| 3 | Receive data block $C_1$ from CPI |
|   | Temporarily store data block $C_1$ in the second queue |
|   | Send data block $C_0$ |
| 4 | Receive data block $D_0$ from CPI |
|   | Temporarily store data block $D_0$ in the first queue |
|   | Receive advance notice indicating that the dead cycle is at the fifth cycle, cycle 4 |
|   | No Transmission - Dead Cycle |
| 0 | Receive data block $D_1$ from CPI |
|   | Temporarily store data block $D_1$ in the second queue |
|   | Send data block $D_0$ |

Similarly, with reference to timing drawing 508 of FIG. 5C, the received data 310 arrives at the third cycle and the control signal c2b_valid_ff 312 indicates that the dead cycle is positioned at the fifth cycle, cycle 4. Accordingly, sent data 510 is transmitted as $A_0B_0C_0XD_0$ to the synchronizer. With reference to timing drawing 512 of FIG. 5D, the received data 310 arrives at the fourth cycle and the control signal c2b_valid_ff 312 indicates that the dead cycle is located at the fifth cycle, cycle 4. The circuit therefore transmits sent data 514 as $A_0B_0XC_0D_0$. With reference to timing drawing 516 of FIG. 5E, the received data 310 arrives at the fifth cycle and the control signal c2b_valid_ff 312 indicates that the dead cycle is located at the fifth cycle, cycle 4. Hence, sent data 518 is optimally transmitted as $A_0XB_0C_0D_0$.

Accordingly, it should be appreciated that by practicing the teachings described herein, one cycle of latency may be saved for each dead cycle during the contiguous transmission of received intervaled data where frequency ratio of N:(N−1) is maintained. Moreover, it should be appreciated that the systems and methods described herein may be practiced with any intervaled data, including multiplexed data, having any number of dead cycles. In particular, the teachings describe herein reduce the latency of channeled data sent across a clock synchronizer where the clock synchronizer is running at a N:M ratio wherein N>M. For a transfer of D data blocks, the latency is reduced at the slower frequency by N−M cycles on the average of (D−1) times for every N cycles. For example, wherein N:M is 5:4 and D=4, with CLK1 running at 250 MHz and CLK2 running at 200 MHz (5 ns period), the latency is reduced by 5 ns*(4−1) times out of (4+1), or 5 ns*3 times (e.g., see FIGS. 5C, 5D and 5E) out of 5 or 5(3/5) or 3 ns on the average. As illustrated in FIGS. 5C, 5D and 5E, the data packet transmission is accelerated (i.e., optimized) by allowing the packets to be placed one cycle earlier than would have been possible under normal transmission.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A system for effectuating the transfer of data blocks having intervals across a clock boundary between a first clock domain and a second clock domain, wherein said first clock domain is operable with a first clock signal and said second clock domain is operable with a second clock signal, said first and second clock signals having a ratio of N first clock cycles to M second clock cycles, wherein N/M>1, comprising:

a first circuit portion for providing said data blocks to a second circuit portion;

a synchronizer controller disposed between said first and second clock domains for providing at least one dead cycle control signal to said second circuit portion, wherein said at least one dead cycle control signal is indicative of the location of at least one dead cycle between said first and second clock signal; and control logic associated with said second circuit portion for generating data transfer control signals responsive to said at least one dead cycle control signal, said data transfer control signals for controlling said second circuit portion whereby said data blocks are transmitted as contiguous data blocks relative to said at least one dead cycle, wherein said control logic is operable to generate data transfer control signals for transferring multi-channeled packet data, each channel's data blocks being interleaved with data blocks of other channels.

2. The system for effectuating the transfer of data blocks having intervals as recited in claim 1, wherein said first circuit portion comprises a packet interface.

3. The system for effectuating the transfer of data blocks having intervals as recited in claim 1, wherein said second circuit portion comprises:

at least one queue operably coupled to said first circuit portion for temporarily storing said data blocks; and a multiplexer (MUX) block operably coupled to said first circuit portion and said at least one queue, said MUX block operating under a MUX selection control signal generated by said control logic for selecting between data blocks stored in said at least one queue and data blocks provided by said first circuit portion without queuing, whereby said data blocks are transmitted as an output of said MUX block to a synchronizer operating under control of said synchronizer controller.

4. The system for effectuating the transfer of data blocks having intervals as recited in claim 1, wherein each of said data blocks comprises one bit.

5. The system for effectuating the transfer of data blocks having intervals as recited in claim 1, wherein each of said data blocks comprises multiple bits.

6. The system for effectuating the transfer of data blocks having intervals as recited in claim 1, wherein said data blocks comprise a header that provides protocol control information relative to said data blocks.

7. The system for effectuating the transfer of data blocks having intervals as recited in claim 6, wherein said header is removed from said header blocks for processing by said control logic.

8. The system for effectuating the transfer of data blocks having intervals as recited in claim 1, wherein said at least one dead cycle comprises N–M dead cycles.

9. The system for effectuating the transfer of data blocks having intervals as recited in claim 1, wherein at least one of said data blocks is positioned adjacent to said at least one dead cycle.

10. The system for effectuating the transfer of data blocks having intervals as recited in claim 1, wherein said dead cycle control signal is provided 0 to N–1 cycles prior to said dead cycle.

* * * * *